United States Patent [19]

Bunting et al.

[11] 3,713,976

[45] Jan. 30, 1973

[54] CULTIVATION OF MICRO-ORGANISMS ON HYDROCARBONS

[75] Inventors: Pamela M. Bunting, Cheswick, Pa.; William W. Leathen, Wexford, Pa.

[73] Assignee: Gulf Research & Development Co., Pittsburgh, Pa.

[22] Filed: June 21, 1971

[21] Appl. No.: 155,213

[52] U.S. Cl. ................ 195/28 R, 195/82, 99/14
[51] Int. Cl. ............................................. C12c 11/08
[58] Field of Search ...... 195/28 R, 3 H, 82, 47, 1, 96, 195/114; 99/14, 2

[56] References Cited

UNITED STATES PATENTS 3,620,927   11/1971   Leathen ............................ 195/82

Primary Examiner—A. Louis Monacell
Assistant Examiner—R. B. Penland
Attorney—Meyer Neishloss et al.

[57] ABSTRACT

Protein concentrates are obtained in a process which includes:

1. Cultivating a hydrocarbon-consuming micro-organism in the presence of an aqueous nutrient medium, a hydrocarbon and a gas containing free oxygen;
2. contacting the cultivated micro-organism from (1.) at a temperature below that which supports active fermentation of the micro-organism with a gas containing free oxygen in the presence of an aqueous nutrient medium containing a thiosulfate compound, e.g., sodium thiosulfate, and a gas containing free oxygen in the absence of added hydrocarbon; and
3. recovering from (2.) a micro-organism having (a) a protein content greater than that of the micro-organism obtained in (1.) and (b) a sulfur-containing amino acid, e.g., cystine and methionine, content greater than that of the micro-organism obtained in (1.).

22 Claims, No Drawings

CULTIVATION OF MICRO-ORGANISMS ON HYDROCARBONS

This invention relates to a process for cultivating micro-organisms on hydrocarbons and more particularly to a process wherein propagation of the micro-organisms is conducted under conditions to increase the proportion of sulfur-containing amino acids in the product without inhibiting the growth of the micro-organisms.

Critical food shortages for both animals and humans in some parts of the world is a problem of growing concern. The use of fertilizers and improved farming techniques have greatly increased crop return per acre of cultivated ground. While increased crop yields has resulted in more food for more people throughout the world, there are still an alarming number of people who are suffering from malnutrition. To alleviate malnutrition, protein and vitamin food supplements have been developed for both animal and human consumption. Protein concentrates for food supplements that are commercially available include fish meal, peanut meal, cottonseed meal, soybean meal and micro-organisms such as bacteria, molds, yeasts and the like.

Micro-organisms, because of their high rate of multiplication in fermentation processes, have received much attention as a source of high quality protein. The ability of micro-organisms to metabolize carbohydrates is well-known. It is equally well-known, however, that carbohydrates are relatively expensive raw materials if the desired end product is a relatively inexpensive micro-organism. Because of the abundance of relatively inexpensive crude oil deposits, a considerable amount of experimental work has been conducted utilizing hydrocarbons derived from petroleum as the sole source of carbon for the growth of micro-organisms. A number of micro-organisms and particularly yeasts and bacteria have been found to grow on substrates containing petroleum hydrocarbons varying from normally gaseous hydrocarbons through normally liquid hydrocarbons and hydrocarbons that are solid under normal atmospheric conditions. When a hydrocarbon-consuming micro-organism is grown in a substrate containing a hydrocarbon under favorable growth-inducing conditions, the micro-organism product has a chemical composition essentially the same as the micro-organism used as seed in the fermentation process.

While it is generally desirable to employ fermentation conditions which prevent the growth of a micro-organism which is a variant from the seed micro-organism it is frequently desirable to obtain a product which is more nutritious than the micro-organism used as seed. Thus, for example, it is desirable in some instances to alter the amino acid profile of the product and to increase the proportion of the sulfur-containing amino acids, i.e., cystine and methionine, in the product. While the proportion of the sulfur-containing amino acids in the micro-organism product can be increased by the addition of certain sulfur-containing compounds, i.e., thiosulfates to the aqueous nutrient medium utilized in the fermentation process, the presence of these compounds during active fermentation of the micro-organism inhibits its growth.

In accordance with the present invention, a process is provided for propagating a micro-organism on a hydrocarbon-containing substrate wherein the proportion of sulfur-containing amino acids in the micro-organism product is increased without inhibiting the growth of the micro-organism. In brief, the process comprises cultivating the hydrocarbon-consuming micro-organism in a fermentation stage and thereafter subjecting the micro-organism product obtained in the fermentation stage to a maturation stage in the presence of an aqueous nutrient medium to which a thiosulfate compound has been added. In the fermentation stage, the hydrocarbon-consuming micro-organism is cultivated at an active fermentation temperature in the presence of an aqueous nutrient medium, a hydrocarbon and a gas containing free oxygen. In the maturation stage, the micro-organism product obtained in the fermentation stage is contacted with a gas containing free oxygen in the presence of an aqueous nutrient medium which contains a thiosulfate compound and in the absence of added hydrocarbon at a temperature below the temperature employed in the active fermentation stage of the process. Maturation of the micro-organism can be conducted in the fermentation vessel or, if desired, the micro-organism product of the fermentation stage can be separated from the fermentation mass (brew) and thereafter contacted in a separate vessel with a gas containing free oxygen in the presence of the aqueous nutrient medium which contains a thiosulfate compound dissolved in the nutrient. The product obtained in the maturation stage has a protein content greater than the protein content of the product from the fermentation stage. The product obtained in the maturation stage also contains an increased proportion of sulfur-containing amino acids.

We have found that a micro-organism product which has an increased protein content and an increased proportion of sulfur-containing amino acids in its amino acid profile can be obtained in a process which comprises cultivating, in a fermentation stage, a hydrocarbon-consuming micro-organism at an active fermentation temperature of about 25° to about 40° C. in the presence of an aqueous nutrient medium, a hydrocarbon and a gas containing free oxygen to obtain a cultivated micro-organism and contacting, in a maturation stage, the cultivated micro-organism obtained in the fermentation stage at a temperature below that which supports active fermentation of the micro-organism with a gas containing free oxygen in the presence of an aqueous nutrient medium containing a thiosulfate compound dissolved therein and in the absence of added hydrocarbon whereby there is obtained a micro-organism product having (1) a protein content greater than that of the cultivated micro-organism obtained in the fermentation stage and (2) a sulfur-containing amino acid content greater than that of the cultivated micro-organism obtained in the fermentation stage or matured without the addition of the thiosulfate compound. The temperature at which maturation is conducted in accordance with the process of the invention depends somewhat upon the particular micro-organism being cultured and upon the nutrient medium employed. If the micro-organism is actively cultivated in the fermentation stage at about 25°, maturation should be effected at a temperature below 25° C. and preferably at a temperature within the range of about 10° C. to about 20° C. If the micro-organism is actively cultivated in the fermentation stage at about 35° C., maturation should be effected at a temperature below 35° C. If the micro-organism is actively cultivated in the fermentation stage at about 40° C., the maturation should be effected at a temperature below 40° C. It is preferred to effect maturation at a temperature which is 5° to 20° C. below the active fermentation temperature.

Micro-organisms which can be cultivated in the process of the invention are those which normally can assimilate carbon from hydrocarbons or those which have been adapted to assimilate carbon from hydrocarbons including molds, bacteria and yeasts. Typical examples of molds are those of the family Aspergillaceae, suitable genera of which are Penicillium and Aspergillus. Specific examples of molds within these genera are *Penicillium rocqueforti, Penicillium glaucum, Penicillium chrysogenum, Penicillium patulum, Penicillium notatum, Penicillium espansum, Aspergillus fumigatus, Aspergillus carbonarious, Aspergillus niger Aspergillus flavus, Aspergillus terreus* and *Aspergillus versicolor*.

Bacteria which can be employed in the process of the invention are those within the group consisting of Pseudonomadales, Eubacteriales and Actinomycetales. The bacteria which are employed are preferably of the families Bacillaceae and Pseudonomadaceae, preferred species being *Bacillus megaterium, Bacillus subtilis* and *Pseudomonas aeruginosa*.

Yeasts which can be employed in the process of the invention are preferably those of the family Cryptococcaceae and especially of the sub-family Cryptococcoideae. Other yeasts can also be employed such as those of the family Endomycetaceae and especially of the sub-family Saccharomycetoideae. Preferred genera of the Cryptococcoideae sub-family are Torulopsis and Candida. Preferred strains of yeast are *Candida utilis, Candida rugosa, Candida lipolytica, Candida tropicalis* and *Torulopsis colliculosa*. Of these yeasts, a strain of Candida tropicalis is preferred, particularly *Candida tropicalis*, strains CS–8–17 and CS–9–5 which are essentially identical strains which have been isolated from petroleum-soaked soils. *Candida tropicalis*, strains CS–8–17 and CS–9–5 have been deposited in the American Type Culture Collection in Rockville, Md. These strains have been assigned the ATCC numbers 20021 and 20326, respectively. The advantage of utilizing a micro-organism which has been isolated from an oil-soaked soil is that the organism is already adapted to metabolize hydrocarbons so that an hydrocarbon-adaptation procedure is not necessary. If the micro-organism, particularly yeast, has been grown in a carbohydrate environment, it is usually necessary to adapt the organism to grow on carbon supplied by the hydrocarbon. This procedure may require a prolonged period of time. Even yeasts which have been isolated from oil-soaked soil may require an adaptation procedure to adapt the yeast to grow on the particular hydrocarbon which is intended to be used as feedstock in the fermentation process.

Inasmuch as micro-organisms are made-up of living cells, their growth, as is true with other living organisms, depends upon an adequate supply of carbon, hydrogen, oxygen, nitrogen and trace amounts of other elements including sodium, potassium, magnesium and iron. Carbon is required for growth and energy. Nitrogen is required for synthesis of protein and other nitrogenous materials. Other elements are required for mineral structure of the cell. In the present process, carbon and hydrogen are supplied by the hydrocarbon; oxygen is supplied by the introduction of air; and nitrogen is supplied through the use of ammonium or other nitrogenous inorganic salts in the aqueous nutrient medium. Trace quantities of other elements necessary for growth of the micro-organism may be supplied as impurities in the inorganic salts or these elements may be added directly in extremely small amounts. Frequently, sufficient quantities of the trace elements are present in tap water.

The hydrocarbon which is utilized as the source of carbon and hydrogen for the micro-organism is a saturated or unsaturated aliphatic hydrocarbon having up to 30 or more carbon atoms per molecule. A preferred hydrocarbon feedstock is a petroleum fraction, especially a petroleum fraction consisting essentially of a mixture of straight chain hydrocarbons. The straight chain hydrocarbons can be present as olefins, paraffins or a mixture containing both olefins and paraffins. Examples of individual hydrocarbons which can be used are n-pentane, l-pentene, n-hexane, l-hexene, n-heptane, l-heptene, n-octane, n-decane, l-decene, n-dodecane, l-dodecene, n-tetradecane, l-tetradecene, n-hexadecane, n-octadecane, n-eicosane, n-tetracosane, n-triacontane and the like. Those hydrocarbons which are liquid at the fermentation conditions employed are preferred. While the individual hydrocarbons can be used, we prefer, for economic reasons to use mixtures of hydrocarbons. Thus, we may use kerosene, gas oil, middle distillate fractions, slack wax and the like. Good results have been obtained with hydrocarbon mixtures comprising naphtha ($C_6$—$C_{13}$), n-paraffins ($C_9$—$C_{13}$), n-paraffins ($C_9$—$C_{16}$) n-paraffins ($C_{14}$—$C_{15}$), n-paraffins ($C_{14}$—$C_{17}$), alpha olefins ($C_{10}$—$C_{16}$), kerosene ($C_9$—$C_{16}$) and slack wax ($C_{17}$—$C_{29}$) alone and in admixture with naphtha. The amount of hydrocarbon employed is that amount required to provide sufficient carbon to support growth of the micro-organism during the fermentation period. All the hydrocarbon can be added at the beginning of the fermentation period, but in a continuous process the hydrocarbon is preferably added continuously or incrementally as the fermentation proceeds. It is preferred to employ only that amount of hydrocarbon required to effect the desired growth in order to avoid subsequent separation difficulties. In a continuous process, pure n-paraffins are added at a rate of about 0.2 to 5 grams of paraffin per liter of the fermentation mass (brew) per hour. When a hydrocarbon mixture is employed, the mixture is added at a rate proportioned to the normal paraffin content, so that the amount of normal paraffin added is about 0.2 to about 5 grams of paraffin per liter of brew in the fermentor per hour. In a batch process, the hydrocarbon comprises about 1 to about 10 percent by weight of the fermentation mass (brew), preferred amounts for most favorable growth of *Candida tropicalis*(CS–8–17 and CS–9–5) being about 2 to about 5 percent by weight.

Oxygen, as disclosed hereinabove, is one of the essential elements required to promote the growth of the micro-organism. While pure oxygen can be employed, we prefer for economic reasons to supply the oxygen as air. In order to effect an optimum growth of the micro-organism, the air should be finely dispersed through the substrate preferably with agitation at a rate sufficient to form a vortex in the liquid. Depending upon the design of the fermentor, various air introducing means can be used including single orifice, half and full ring types with openings for air discharge directed upwardly and/or downwardly, and sintered glass percolator types with various impellers for lifting air. Impellers, when employed, can be rotated at rates from 40 to 1,000 rpm or more, the particular rate being chosen to create a vortex in the liquid. Regardless of the type of air introduction means employed, operation should be such as to avoid excessive foaming since foaming tends to entrap the micro-organism and remove it from the source of soluble nutrients required in its growth. While the amount of air employed depends somewhat on the size and design of the fermentor, good results are obtained in 14-liter fermentors containing 7 liters of brew when employing sterile air at rates of 2 to 10 liters per minute.

The make-up of the aqueous nutrient medium which we employ in the fermentation stage of the process will vary to some extent depending upon the type of micro-organism used and the type of hydrocarbon. In general, the aqueous nutrient medium in the fermentation stage comprises a mixture of mineral salts which furnish ions of ammonium, nitrate or nitrite, potassium, ferrous or ferric, calcium, magnesium, phosphate, sulfate as well as ions of trace elements including zinc, manganese, copper and molybdenum. Inasmuch as water is included in the nutrient mixture, many of the mineral salts can be incorporated into the substrate in sufficient quantity through the use of tap water. It is desirable, however, to add the salts to the mixture to insure their presence in sufficient quantity for growth of the micro-organism. The nutrient mixture consists primarily of water, which may constitute about 50 to 99 percent by weight or more of the total nutrient mixture. Generally, the water is employed in an amount normally used in microbial synthesis. In general, in a continuous process, the aqueous nutrient medium is added at a rate of about 0.10 to 0.30 liter per liter of brew in the fermentor per hour, a preferred rate for most favorable growth of *Candida tropicalis* (CS-8-17 and CS-9-5) being about 0.15 to about 0.25 liter per liter of brew per hour.

A typical mineral salts medium referred to as Media Formulation A for the growth of yeasts of the genus Candida, for example *Candida tropicalis*, in the process of the invention has the following composition:

Media Formulation A

| Macro Ions, (g/l): | |
|---|---|
| Ammonium sulfate, $(NH_4)_2SO_4$ | 0.66 |
| Magnesium sulfate, $MgSO_4 \cdot 7H_2O$ | 1.0 |
| Sodium chloride, NaCl | 0.2 |
| Calcium chloride, $CaCl_2 \cdot 2H_2O$ | 0.2 |
| Potassium dihydrogen phosphate, $KH_2PO_4$ | 2.0 |
| Trace Elements, (μg/l) | |
| Boric acid, $H_3BO_3$ | 1000 |
| Copper sulfate, $CuSO_4 \cdot 5H_2O$ | 80 |
| Potassium iodide, KI | 200 |
| Ferric chloride, $FeCl_3 \cdot 6H_2O$ | 400 |
| Manganese sulfate, $MnSO_4 \cdot H_2O$ | 800 |
| Sodium molybdate, $Na_2MoO_4 \cdot H_2O$ | 400 |
| Zinc sulfate, $ZnSO_4 \cdot 7H_2O$ | 800 |
| Vitamins, (μg/l): | |
| Biotin | 5 |
| Distilled water, sufficient to form 1 liter of solution | |

If desired, the above Media Formulation A can be enriched with vitamins other than Biotin in which case the amount of Biotin can be reduced. Thus, suitable vitamin enriched aqueous nutrient mediums for use in the process of the invention may have the following composition:

Media Formulation A (Vitamin enriched)

| Components | Single strength | Double strength |
|---|---|---|
| Macro Ions, (g/l): | | |
| Ammonium sulfate, $(NH_4)_2SO_4$ | 0.66 | 0.66 |
| Magnesium sulfate, $MgSO_4 \cdot 7H_2O$ | 0.5 | 1.0 |
| Sodium chloride, NaCl | 0.1 | 0.2 |
| Calcium chloride, $CaCl_2 \cdot 2H_2O$ | 0.1 | 0.2 |
| Potassium dihydrogen phosphate, $KH_2PO_4$ | 1.0 | 2.0 |
| Trace Elements, (μg/l): | | |
| Boric acid, $H_3BO_3$ | 500 | 1,000 |
| Copper sulfate, $CuSO_4 \cdot 5H_2O$ | 40 | 80 |
| Potassium iodide, KI | 100 | 200 |
| Ferric chloride, $FeCl_3 \cdot 6H_2O$ | 200 | 400 |
| Manganese sulfate, $MnSO_4 \cdot H_2O$ | 400 | 800 |
| Sodium molybdate, $Na_2MoO_4 \cdot H_2O$ | 200 | 400 |
| Zinc sulfate, $ZnSO_4 \cdot 7H_2O$ | 400 | 800 |
| Vitamins, (μg/l): | | |
| Biotin | 2 | 4 |
| Calcium pantothenate | 400 | 800 |
| Folic acid | 2 | 4 |
| Inositol | 2,000 | 4,000 |
| Niacin | 400 | 800 |
| p-Aminobenzoic acid | 200 | 400 |
| Pyridoxin hydrochloride | 400 | 800 |
| Riboflavin | 200 | 400 |
| Thiamin hydrochloride | 400 | 800 |
| Distilled water, sufficient to form 1 liter of solution | | |

Another typical mineral salts medium referred to as Media Formulation B which can be used as a nutrient in the process of the invention has the following composition:

Media Formulation B

| Diammonium phosphate, $(NH_4)_2HPO_4$ | 1.3 g. |
|---|---|
| Potassium dihydrogen phosphate, $KH_2PO_4$ | 1.3 g. |
| Magnesium sulfate, $MgSO_4 \cdot 7H_2O$ | 0.2 g. |
| Calcium chloride, $CaCl_2 \cdot 2H_2O$ | 0.02 g. |
| Ferric chloride, $FeCl_3 \cdot 6H_2O$ | trace |
| Yeast extract | 1.0 g. |
| Distilled water, sufficient to form 1 liter of solution | |

The aqueous nutrient medium utilized in the maturation stage of the present process comprises an aqueous nutrient medium as defined above to which has been added a small amount of a compound capable of furnishing thiosulfate ions for assimilation by the micro-organism. Compounds capable of furnishing thiosulfate ions when added to the aqueous nutrient medium include sodium thiosulfate, potassium thiosulfate, calcium thiosulfate, magnesium thiosulfate, strontium thiosulfate, ammonium thiosulfate and the like. The aqueous nutrient medium to which the thiosulfate compound is added can be either freshly prepared medium similar to that used in the fermentation stage as described hereinabove or aqueous nutrient medium which previously has been used in the fermentation stage. Thus, in a preferred embodiment of the invention, the entire contents of the fermentation vessel are transferred to a maturation vessel wherein the thiosulfate compound is added. If desired, a small amount of freshly prepared aqueous nutrient medium can be added to make up for any loss encountered in the transfer or to make up for nutrients which have been depleted in the fermentation stage.

The amount of the thiosulfate compound which effects an increased proportion of the sulfur-containing amino acids in the matured product is a small amount, and generally is expressed in terms of parts of sulfur per million parts of aqueous nutrient medium. In general, the thiosulfate compound is employed in amounts sufficient to give about 15 to about 400 parts by weight of sulfur per million parts by weight of aqueous nutrient medium. A preferred range of sulfur is about 25 to about 150 ppm. While amounts of sulfur in excess of 400 ppm can be used with some thiosulfate compounds, there are instances when 400 ppm of sulfur tends to inhibit the growth of the micro-organism. Thus, the optimum amount of thiosulfate compound may vary from one compound to another. In any event, the thiosulfate compound is employed in an amount sufficient to increase the proportion of the sulfur-containing amino acids in the matured product but insufficient to inhibit the growth of the micro-organism.

During the course of the growth of a hydrocarbon-assimilating micro-organism on a hydrocarbon substrate in the presence of an aqueous mineral nutrient medium and an oxygen containing gas, oxygen is absorbed and carbon dioxide is liberated, and acidic substances, principally fatty acids are formed. The net effect of these processes is a reduction of the pH of the aqueous nutrient medium. Thus, to prevent a build-up of acidity which adversely affects the growth of the micro-organism, it is essential to add an alkaline material to restore the pH of the aqueous nutrient medium to a desired level. If the pH is not maintained at a desired level, the growth of the micro-organism ceases, that is cellular density no longer increases so that a stationary growth phase is encountered.

The optimum pH of the aqueous nutrient medium depends somewhat upon the nature of the substrate and the particular micro-organism being cultured. The pH is usually within the range of about 1.5 to about 8. With mineral salts substrates, the optimum pH for most yeast cultures is a pH of about 5. When employing a yeast nitrogen base substrate, optimum growth for a yeast of the strain of *Candida tropicalis* occurs at a pH of about 2 to 5, a pH of about 3 being referred. While optimum ranges of pH for molds is also within the range of about 2 to 5, bacteria usually requires a higher pH in the order of about 6 to 8. In order to maintain the pH at any desired level, we may add to the aqueous nutrient medium, either continuously or in separate increments, any suitable alkaline materials such as sodium hydroxide, potassium hydroxide, disodium hydrogen phosphate, ammonium hydroxide and ammonia.

The optimum temperature for the growth of the micro-organism is dependent upon the particular organism employed but with a yeast will usually be within the range of about 25° C. to about 40° C. When using a strain of *Candida tropicalis* the preferred temperature range is about 25° C. to about 35° C.

Micro-organisms grown under controlled conditions in the presence of variable amounts of all nutrients required to support growth and under environmental conditions favorable to growth typically grow in a characteristic pattern which may be designated as follows:

1. Initial stationary phase—In this phase, the number of micro-organisms remains constant.
2. Lag phase—During this period, the rate of multiplication increases with time.
3. Logarithmic growth phase—The rate of multiplication remains constant; the generation time is the same throughout the period.
4. Negative growth phase—During this phase, the rate of multiplication decreases and the average generation time increases. The organisms continue to increase in number, but at a slower rate than during the logarithmic phase.
5. Maximum stationary phase—The number of living organisms remains constant, i.e., the death rate equals the rate of reproduction.
6. Accelerated death phase—The number of micro-organisms declines with the increasing rapidity. The average rate of death increases to a maximum.
7. Logarithmic death phase—In this period, the rate of death is constant.

According to the present invention active fermentation of the micro-organism in the fermentation stage is interrupted at the end of the logarithmic growth phase and the cultivated micro-organism so obtained is subjected to treatment in a maturation stage at a temperature below that which supports active fermentation in the presence of the thiosulfate-containing aqueous nutrient medium. During the treatment in the maturation stage, the protein content of the product is increased and the sulfur-containing amino acid content of the product is increased.

At the conclusion of the maturation stage in the process of the invention, the product is separated from the thiosulfate-containing nutrient medium and then washed one to three times with water and finally dried under conditions sufficiently mild to avoid autolysis but under conditions sufficiently severe to assure recovery of a non-viable micro-organism containing not more than about 10 percent moisture, usually less than 1 percent moisture. With bacteria, the drying temperature may be in the order of about 120° C. The drying temperature for most yeasts to insure the recovery of nonviable cells in an oven is within the range of about 50° C. to about 130° C. If spray drying is employed, the temperature of the dryer may be in the order of about 150° C. without adversely affecting the quality of the yeast. In drying a stain of *Candida tropicalis*, we have recovered nonviable cells by employing a drying temperature of 60° C. in an oven.

In order to illustrate the improved results obtained in accordance with the process of the invention, comparative examples are set forth hereinafter wherein propagation of the micro-organism is effected (1) in a fermentation stage only with and without the addition of a herein-defined thiosulfate compound and (2) in combined fermentation-maturation stages with and without the addition of a herein-defined thiosulfate compound in the maturation stage only. In the comparative examples, we have utilized a hydrocarbon-consuming yeast as the micro-organism, i.e., *Candida tropicalis*, strain CS-9-5 (ATCC 20326). This yeast was isolated through an enrichment culture procedure from oil-soaked soil adjacent to operating oil wells located in Pennsylvania. The micro-organism was characterized and identified in accordance with the classification in "The Yeasts" by J. Lodder and N. J. W. Kreger-Van Rij, North Holland Publishing Co., Amsterdam, 1952, Interscience Publishers, Inc., New York. The micro-organism was found to be identical in all physiological characteristics with *Candida tropicalis* (ATCC 1410) obtained from the American Type Culture Collection, Washington, D. C. Morphologically, the micro-organism which we isolated was similar to *Candida tropicalis* (ATCC 1410), differing primarily in cell size. The cells of the strain *Candida tropicalis* (CS-9-5) (ATCC 20326) were smaller than the cells in *Candida tropicalis* (ATCC 1410).

The hydrocarbon used as a source of carbon and hydrogen in the following Example I is a $C_9$–$C_{16}$ normal paraffin mixture, the normal paraffin distribution being substantially as follows:

| n-Paraffin | Weight Percent |
|---|---|
| $C_9$ | 0.25 |
| $C_{10}$ | 5.11 |
| $C_{11}$ | 15.40 |
| $C_{12}$ | 26.58 |
| $C_{13}$ | 35.92 |
| $C_{14}$ | 0.38 |
| $C_{15}$ | 15.75 |
| $C_{16}$ | 0.55 |

The hydrocarbon used as a source of carbon and hydrogen in the following Examples II, III and IV is a $C_9$–$C_{13}$ normal paraffin mixture, the normal paraffin distribution being substantially as follows:

| n-Paraffin | Weight Percent |
|---|---|
| $C_9$ | trace |
| $C_{10}$ | 6.8 |
| $C_{11}$ | 35.2 |
| $C_{12}$ | 32.1 |
| $C_{13}$ | 25.8 |

In the following specific examples, Example I and Part A of each of Examples III and IV are for comparison purposes and are not intended to be within the scope of the invention. While Example II and Part B of each of Examples III and IV illustrate the process of the invention, it should be understood that these Examples are for illustration purposes only and are not intended to limit the scope of the invention.

EXAMPLE I

This example illustrates how the growth of a hydrocarbon-consuming micro-organism is affected by the presence of sodium thiosulfate in the fermentation stage.

For control purposes, 400 ml of aqueous nutrient medium referred to hereinabove as Media Formulation A enriched with vitamins and 10 ml of the $C_9$–$C_{16}$ normal paraffin mixture described hereinabove are placed in a 1-liter shake flask. The flask is inoculated with 2.0 ml. of *Candida tropicalis* (CS-9-5) growing in Sabouraud dextrose broth (4day culture). The flask is then placed on a rotary shaker where incubation is allowed to continue at room temperature, i.e., about 70° to 75° F. for 13 days.

In two additional 1-liter shake flasks which contain 400 ml of Media Formulation A enriched with vitamins, 10 ml of the $C_9$–$C_{16}$ normal paraffin mixture and 2.0 ml of the *Candida tropicalis* (CS-9-5) growing in Sabouraud dextrose broth (4day culture), the above procedure is repeated except that one flask also contains 100 ppm sulfur as sodium thiosulfate (0.16g$Na_2S_2O_3 \cdot 5H_2O$). The second flask contains 4 times as much sodium thiosulfate (0.64g$Na_2S_2O_3 \cdot 5H_2O$) which is equivalent to 400 ppm of sulfur.

After 13 days of incubation on the rotary shaker, the flasks are removed and the yeast cells in each flask are separately harvested. Harvesting of the yeast cells is accomplished by collecting them on a Whatman No. 50 filter paper, resuspending them in distilled water and refiltering. The cells are then washed with ethanol from the filter paper into a weighing pan where they are evaporated to dryness over steam. The cells are then further dried in an oven at 105° C. to obtain a product having less than 1 percent by weight of water. The dried yeast product thus obtained is examined for crude protein content and amino acid content. The product, for example, is subjected to liquid column chromatographic analysis to determine the amino acid distribution. Since we are primarily concerned with the protein content and the amino acid content of the product and particularly the proportion of lysine, methionine and cystine in the amino acids only these data are given in Table I.

TABLE I

| Analysis after fermentation, % by weight of dried yeast product | Control no sodium thiosulfate | 100 ppm S as sodium thiosulfate during fermentation | 400 ppm S as sodium thiosulfate during fermention |
|---|---|---|---|
| Crude protein | 37.3 | 36.4 | 32.9 |
| Total Amino acids | 31.85 | 34.63 | 30.35 |
| Lysine | 2.30 | 3.25 | 2.25 |
| Methionine | 0.41 | 0.54 | 0.50 |
| Cystine | 0.33 | 0.39 | 0.39 |
| Combined cystine and methionine | 0.74 | 0.93 | 0.89 |

It will be noted from the data in Table I that the presence of sodium thiosulfate in the aqueous nutrient medium during the fermentation stage gives a higher proportion of methionine and cystine in the dried yeast product, but that there is a decrease in the crude protein content of the yeast product.

EXAMPLE II

This example illustrates the growth of a hydrocarbon-consuming micro-organism in a fermentation stage followed by maturation in a separate vessel. Sodium thiosulfate is present in the maturation stage only.

Seven liters of aqueous nutrient medium referred to hereinabove as Media Formulation A are introduced into a 14-liter Pyrex glass fermentor jar equipped with a stainless steel head assembly. The head assembly contains ports for the addition of nutrients and removal of samples, an agitator shaft, an air sparger line, baffles and a thermometer well. The fermentor jar is placed in a water bath which is adjusted to maintain the fermentation medium at 28°±1° C. The fermentor is equipped with impellers connected to a drive mechanism capable of rotating the impellers at rates up to 1,000 rpm. The air which is introduced into the fermentor through the sparger is passed through a stainless steel filter tube packed with Pyrex glass wool to remove any particles of dust as well as any air-borne micro-organisms. The nutrient medium is then inoculated with 25 grams of wet (80 percent moisture) yeast of the strain *Candida tropicalis* (CS-9-5). The cellular density of the yeast in the fermentor is thus about 5 g. of dry matter per 7 liters of fermentation mass.

Active fermentation is conducted for 8 hours at 28°±1 C. with an aeration rate of about 5 liters per minute at impeller speeds of 500 to 700 rpm. During this 8-hour period a total of 30.6 ml of the above-described $C_9$–$C_{13}$ normal paraffin mixture are added at hourly intervals in increments increasing from 1.9 ml in the first hour to 6.7 ml in the last hour. During this same 8-hour period of total of 20.6 ml of an aqueous solution of ammonium hydroxide and ammonium sulfate containing about 50 mg of nitrogen per ml are added at hourly intervals in increasing increments starting with 1.3 ml in the first hour and ending with 4.5 ml in the last hour. The pH of the fermentation mass is maintained at about 3 during the active fermentation period by the addition of ammonium hydroxide. At the end of the 8-hour active fermentation period a sample of the fermentation mass (brew) is removed wherein the yeast cells are harvested by filtering, washing with water, refiltering and drying prior to evaluation as to protein content, amino acid content and amino acid profile.

Separate 600 ml portions of the fermentation mass (brew) removed from the fermentor jar are placed in 2-liter, baffled shake flasks. For control purposes, nothing except the fermentation mass is added to one of the shake flasks. To the other flasks, the fermentation mass is admixed with separate portions of sodium thiosulfate. In the present example, the fermentation mass is admixed in separate flasks with 25 ppm, 35 ppm and 50 ppm sulfur as sodium thiosulfate. All of the flasks are then subjected to maturation conditions. These conditions comprise rotary agitation of the shake flasks at 12.5°±2° C. for about 18 hours. At the end of the 18-hour maturation period the yeast cells are harvested as above and examined for protein content, amino acid content and amino acid profile. The results obtained with respect to protein content, amino acid content and the amino acid profile for lysine, methionine and cystine are summarized in Table II.

TABLE II

| Analyses, % by weight of dried yeast product | Control After no sodium fermentation | After Maturation 25 ppm S as sodium thiosulfate | 35 ppm S as sodium thiosulfate | 50 ppm S as sodium thiosulfate |
|---|---|---|---|---|
| Crude Protein | 44.8 | 44.5 | 47.0 | 49.0 | 45.5 |
| Lysine | 3.47 | 4.68 | 4.86 | 4.79 | 4.10 |
| Methionine | 0.37 | 0.46 | 0.50 | 0.49 | 0.48 |
| Cystine | 0.32 | 0.44 | 0.45 | 0.53 | 0.47 |
| Combined cystine and methionine | 0.69 | 0.90 | 0.95 | 1.02 | 0.95 |

It will be noted from the data in Table II that the presence of sodium thiosulfate in the aqueous nutrient medium during the maturation stage gives a higher proportion of methionine and cystine in the amino acids obtained and that there is an increase in the crude protein content of the yeast product. While the improvement with 50 ppm of sulfur as sodium thiosulfate is not as great as the improvement with 35 ppm, the protein content and the cystine and methionine content is greater than that of the yeast obtained in the fermentation stage or in the maturation stage with no sodium thiosulfate.

EXAMPLE III

This example illustrates the growth of a hydrocarbon-consuming micro-organism in a fermentation stage followed by maturation in the same vessel. For control purposes, Part A of this example does not utilize sodium thiosulfate either during fermentation or during maturation. Part B of this example illustrates the improved result when sodium thiosulfate is added in the maturation stage.

PART A

With No Sodium Thiosulfate

Seven liters of aqueous nutrient medium referred to hereinabove as Media Formulation A are introduced into a 14-liter Pyrex glass fermentor jar equipped with a stainless steel head assembly. The head assembly contains ports for the addition of nutrients and removal of samples, an agitator shaft, an air sparger line, baffles and a thermometer well. The fermentor jar is placed in a water bath which is adjusted to maintain the fermentation medium at 28°±1° C. The fermentor is equipped with impellers connected to a drive mechanism capable of rotating the impellers at rates up to 1,000 rpm. The air which is introduced into the fermentor through the sparger is passed through a stainless steel filter tube packed with Pyrex glass wool to remove any particles of dust as well as any air-borne micro-organisms. The nutrient medium is then inoculated with 25 grams of wet (80 percent moisture) yeast of the strain *Candida tropicalis* (CS-9-5). The cellular density of the yeast in the fermentor is thus about 5 g. of dry matter per 7 liters of fermentation mass.

Active fermentation is conducted for 8 hours at 28°±1 C. with an aeration rate of abouc5 liters per minute at impeller speeds of 500 to 700 rpm. During this 8-hour period a total of 30.6 ml of the above-described $C_9$–$C_{13}$ normal paraffin mixture are added at hourly intervals in increments increasing from 1.9 ml in the first hour to 6.7 ml in the last hour. During this same 8-hour period a total of 20.6 ml of an aqueous solution of ammonium hydroxide and ammonium sulfate containing about 50 mg of nitrogen per ml are added at hourly intervals in increasing increments starting with 1.3 ml in the first hour and ending with 4.5 ml in the last hour. The pH of the fermentation mass is maintained at about 3 during the active fermentation period by the addition of ammonium hydroxide. At the end of the 8-hour active fermentation period a sample of the fermentation mass (brew) is removed for evaluation as to protein content, amino acid content and amino acid profile.

The remainder of the fermentation mass in the fermentor jar without being removed therefrom is subjected to an 18-hour maturation period during which time neither hydrocarbon nor nitrogen is added. During the maturation period, the temperature of the brew is reduced below that which will support active fermentation, i.e., below about 25° C. In this example, the temperature during maturation is maintained at 12.5°±2° C. with an aeration rate of about 0.75 liter per minute at an impeller speed of about 450 rpm to control foaming. A reduced aeration rate is employed to avoid excessive foaming. A reduced impeller speed is employed to avoid possible disintegration of the cellular material. At the end of the 18-hour maturation period yeast cells are harvested by filtering the brew to recover a yeast paste. The yeast paste is washed with water and filtered (3 times). The wet yeast cells are then dried at a temperature of about 105° C. The moisture content of the dried product yeast is less than about 1 percent by weight of the product. The dried product is then evaluated as to protein content, amino acid content and amino acid profile.

PART B (With Sodium Thiosulfate During Maturation)

The procedure of Example II, Part A is repeated except that 100 ppm sulfur as sodium thiosulfate is added just prior to the initiation of the 18-hour maturation period. At the end of the experiment the yeast cells are harvested as in Part A hereof and examined for protein content, amino acid content and amino acid profile.

The results obtained with respect to protein content, amino acid content and the amino acid profile for lysine, methionine and cystine for Parts A and B are summarized in Table III.

TABLE III

| Analyses, % BY weight of dried yeast product | Part A Control No sodium thiosulfate | | Part B 100 ppm S as sodium thiosulfate during maturation only | |
|---|---|---|---|---|
| | A.F.[1] | A.M.[2] | A.F.[1] | A.M.[2] |
| Crude Protein | 49.4 | 51.3 | 50.5 | 53.8 |
| Total Amino acids | 38.3 | 37.1 | 39.5 | 41.1 |
| Lysine | 3.52 | 3.54 | 3.59 | 3.72 |
| Methionine | 0.63 | 0.66 | 0.66 | 0.79 |
| Cystine | 0.35 | 0.35 | 0.33 | 0.52 |
| Combined cystine and methionine | 0.98 | 1.01 | 0.99 | 1.31 |

[1]A.F. = After Fermentation
[2]A.M. = After Maturation

It will be noted from the data in Table III that the presence of sodium thiosulfate in the aqueous nutrient medium during the maturation stage gives a higher proportion of methionine and cystine in the amino acids obtained and that there is an increase in the crude protein content of the yeast. The protein content and the cystine and methionine content is greater than that of the yeast obtained in the fermentation stage or in the maturation stage with no sodium thiosulfate.

EXAMPLE IV

This example illustrates the growth of a hydrocarbon-consuming micro-organism in a fermentation stage followed by maturation in the same vessel. The procedure followed in this example is the same as that used in Parts A and B of Example III except that the sodium thiosulfate used in Example III is replaced with ammonium thiosulfate in Example IV.

The results obtained with respect to protein content and amino acid profile for lysine, methionine and cystine for Parts A and B are summarized in Table IV.

TABLE IV

| Analyses, % by weight of dried yeast product | Part A Control No ammonium thiosulfate | | Part B 100 ppm S as ammonium thiosulfate during maturation only | |
|---|---|---|---|---|
| | A.F.[1] | A.M.[2] | A.F.[1] | A.M.[2] |
| Crude Protein | 42.8 | 49.4 | 43.5 | 50.6 |
| Lysine | 3.41 | 4.16 | 3.68 | 4.02 |
| Methionine | 0.46 | 0.51 | 0.47 | 0.54 |
| Cystine | 0.39 | 0.48 | 0.39 | 0.60 |
| Combined cystine and methionine | 0.85 | 0.99 | 0.86 | 1.14 |

[1]A.F. = After Fermentation
[2]A.M. = After Maturation

It will be noted from the data in Table IV that the presence of ammonium thiosulfate in the aqueous nutrient medium during the maturation stage gives a higher proportion of methionine and cystine in the amino acids obtained and that there is an increase in the crude protein content of the yeast. The protein content and the cystine and methionine content is greater than that of the yeast obtained either in the fermentation stage or in the maturation stage and with no ammonium thiosulfate.

Results similar to those obtained above with sodium thiosulfate and ammonium thiosulfate are also obtained when using other thiosulfates including potassium thiosulfate, calcium thiosulfate, magnesium thiosulfate and strontium thiosulfate.

The make-up of *Candida tropicalis* (CS-9-5) obtained in the process of the present invention may vary slightly from one fermentation to another. A typical chemical composition of the dried product is as follows:

| | *Candida tropicalis* (CS-9-5) Percent by weight |
|---|---|
| Total nitrogen | 8.60 |
| Crude protein | 53.8 |
| Total amino acids | 41.1 |

A summary of the amino acid profile for a typical *Candida tropicalis* (CS-9-5) product of the invention is as follows:

| Amino Acids | Percent by weight of dried yeast product | Candida tropicalis (CS-9-5) % by weight of protein fraction |
|---|---|---|
| Lysine | 3.72 | 9.06 |
| Histidine | 0.69 | 1.68 |
| Arginine | 1.89 | 4.59 |

| | | |
|---|---|---|
| Aspartic Acid | 4.62 | 11.25 |
| Threonine | 2.52 | 6.12 |
| Serine | 1.86 | 4.52 |
| Glutamic Acid | 4.66 | 11.37 |
| Proline | 1.63 | 3.96 |
| Glycine | 2.22 | 5.42 |
| Alanine | 2.43 | 5.93 |
| Cystine | 0.52 | 1.26 |
| Valine | 3.15 | 7.68 |
| Methionine | 0.79 | 1.92 |
| Isoleucine | 2.48 | 6.03 |
| Leucine | 3.56 | 8.68 |
| Tyrosine | 1.40 | 3.40 |
| Phenylalanine | 2.27 | 5.52 |
| Tryptophan | 0.66 | 1.60 |

While our invention has been described with reference to various specific examples and embodiments, it will be understood that the invention is not limited to such examples and embodiments and may be variously practiced within the scope of the claims hereinafter made.

We claim:

1. A process which comprises cultivating in a fermentation stage a hydrocarbon-consuming micro-organism at an active fermentation temperature in the presence of an aqueous nutrient medium, a hydrocarbon and a gas containing free oxygen; contacting in a maturation stage the cultivated micro-organism obtained in the fermentation stage at a temperature below that which supports active fermentation of the micro-organism with a gas containing free oxygen in the presence of an aqueous nutrient medium containing a small amount of a compound capable of furnishing thiosulfate ions dissolved therein and in the absence of added hydrocarbon; and recovering a micro-organism product having (1) a protein content greater than that of the cultivated micro-organism obtained in the fermentation stage and (2) a sulfur-containing amino acid content greater than that of the cultivated micro-organism obtained in the fermentation stage.

2. A process according to claim 1 wherein said micro-organism is a bacterium.

3. A process according to claim 1 wherein said micro-organism is a yeast.

4. A process according to claim 3 wherein the compound capable of furnishing thiosulfate ions is selected from the group consisting of sodium thiosulfate, potassium thiosulfate, calcium thiosulfate, magnesium thiosulfate, strontium thiosulfate and ammonium thiosulfate.

5. A process according to claim 4 wherein the thiosulfate compound is employed in an amount sufficient to give about 15 to about 400 parts by weight of sulfur per million parts by weight of aqueous nutrient medium.

6. A process which comprises cultivating in a fermentation stage a hydrocarbon-consuming yeast at an active fermentation temperature of about 25° C. to about 40° C. in the presence of an aqueous nutrient medium, a hydrocarbon and a gas containing free oxygen; contacting in a maturation stage the cultivated yeast obtained in the fermentation stage at a temperature which is 5° to 20° C. below the active fermentation temperature with a gas containing free oxygen in the presence of an aqueous nutrient medium containing a small amount of a compound capable of furnishing thiosulfate ions dissolved therein and in the absence of added hydrocarbon; and recovering a yeast product having (1) a protein content greater than that of the cultivated yeast obtained in the fermentation stage and (2) a sulfur-containing amino acid content greater than that of the cultivated yeast obtained in the fermentation stage.

7. A process according to claim 6 wherein the compound capable of furnishing a thiosulfate ions is selected from the group consisting of sodium thiosulfate, potassium thiosulfate, calcium thiosulfate, magnesium thiosulfate, strontium thiosulfate and ammonium thiosulfate.

8. A process according to claim 7 wherein the thiosulfate compound is employed in an amount sufficient to give about 15 to about 400 parts by weight of sulfur per million parts by weight of aqueous nutrient medium.

9. A process according to claim 8 wherein the yeast is of the family Cryptococcaceae.

10. A process according to claim 9 wherein the yeast is of the subfamily Cryptococcoideae.

11. A process according to claim 10 wherein the yeast is of the genus Candida.

12. A process according to claim 11 wherein the yeast is of the strain *Candida tropicalis*.

13. A process according to claim 12 wherein the yeast is *Candida tropicalis*, strain CS-9-5.

14. A process according to claim 8 wherein the hydrocarbon is a liquid petroleum fraction consisting essentially of a mixture of straight chain hydrocarbons.

15. A process according to claim 14 wherein the liquid petroleum fraction is a mixture of $C_9$ to $C_{13}$ normal paraffins.

16. A process according to claim 8 wherein the pH of the aqueous nutrient medium is within the range of about 1.5 to about 8.

17. A process according to claim 8 wherein the oxygen-containing gas is air.

18. A process which comprises cultivating in a fermentation stage a hydrocarbon-consuming yeast at an active fermentation temperature of about 25° C. to about 40° C. in the presence of an aqueous nutrient medium, a hydrocarbon and a gas containing free oxygen; contacting in a maturation stage the cultivated yeast obtained in the fermentation stage at a temperature of about 10° C. to about 20° C. with a gas containing free oxygen in the presence of an aqueous nutrient medium containing a small amount of a compound capable of furnishing thiosulfate ions dissolved therein and in the absence of added hydrocarbon; and recovering a yeast product having (1) a protein content greater than that of the cultivated yeast obtained in the fermentation stage and (2) a sulfur-containing amino acid content greater than that of the cultivated yeast obtained in the fermentation stage.

19. A process which comprises cultivating in a fermentation stage a hydrocarbon-consuming yeast of the strain *Candida tropicalis* at a temperature of about 25° C. to about 35° C. in the presence of an aqueous nutrient medium whose pH is maintained within the range of about 2 to about 5, a hydrocarbon feedstock comprising a mixture of $C_9$ to $C_{13}$ normal paraffins and air; contacting in a maturation stage the cultivated yeast obtained in the fermentation stage at a temperature of about 10° C. to about 20° C. with air in the presence of an aqueous nutrient medium containing a small amount of a compound capable of furnishing thiosulfate ions dissolved therein and in the absence of added hydrocarbon feedstock; and recovering a *Candida tropicalis* product having (1) a protein content greater than that of the cultivated yeast obtained in the fermentation stage and (2) a sulfur-containing amino acid content greater than that of the cultivated yeast obtained in the fermentation stage.

20. A process which comprises cultivating in a fermentation stage a hydrocarbon-consuming yeast of the strain *Candida tropicalis* at a temperature of about 25° C. to about 35° C. in the presence of an aqueous nutrient medium whose pH is maintained at about 3, a hydrocarbon feedstock comprising a mixture of $C_9$ to $C_{13}$ normal paraffins and air; contacting in a maturation stage the cultivated yeast obtained in the fermentation stage at a temperature of about 10° C. to about 20° C. with air in the presence of an aqueous nutrient medium containing a small amount of a compound capable of furnishing thiosulfate ions dissolved therein and in the absence of added hydrocarbon feedstock; and recovering a *Candida tropicalis* product having (1) a protein content greater than that of the cultivated yeast obtained in the fermentation stage and (2) a sulfur-containing amino acid content greater than that of the cultivated yeast obtained in the fermentation stage.

21. A process which comprises cultivating in a fermentation stage a hydrocarbon-consuming yeast of the strain *Candida tropicalis* at a temperature of about 25° C. to about 35° C. in the presence of an aqueous nutrient medium whose pH is maintained at about 3, a hydrocarbon feedstock comprising a mixture of $C_9$ to $C_{13}$ normal paraffins and air; contacting in a maturation stage the cultivated yeast obtained in the fermentation stage at a temperature of about 10° C. to about 20° C. with air in the presence of an aqueous nutrient medium containing about 25 to about 150 parts by weight of sulfur as sodium thiosulfate per million parts by weight of aqueous nutrient medium and in the absence of added hydrocarbon feedstock; and recovering a *Candida tropicalis* product having (1) a protein content greater than that of the cultivated yeast obtained in the fermentation stage and (2) a cystine and methionine content greater than that of the cultivated yeast obtained in the fermentation stage.

22. A process which comprises cultivating in a fermentation stage a hydrocarbon-consuming yeast of the strain *Candida tropicalis* at a temperature of about 25° C. to about 35° C. in the presence of an aqueous nutrient medium whose pH is maintained at about 3, a hydrocarbon feedstock comprising a mixture of $C_9$ to $C_{13}$ normal paraffins and air; contacting in a maturation stage the cultivated yeast obtained in the fermentation stage at a temperature of about 10° C. to about 20° C. with air in the presence of an aqueous nutrient medium containing about 25 to about 150 parts by weight of sulfur as ammonium thiosulfate per million parts by weight of aqueous nutrient medium and in the absence of added hydrocarbon feedstock; and recovering a *Candida tropicalis* product having (1) a protein content greater than that of the cultivated yeast obtained in the fermentation stage and (2) a cystine and methionine content greater than that of the cultivated yeast obtained in the fermentation stage.

* * * * *